US009316314B2

(12) United States Patent
Meuter et al.

(10) Patent No.: US 9,316,314 B2
(45) Date of Patent: Apr. 19, 2016

(54) SEALING ARRANGEMENT AND PUMP HAVING A SEALING ARRANGEMENT

(71) Applicant: Sulzer Pumpen AG, Winterthur (CH)

(72) Inventors: Paul Meuter, Seuzach (CH); Thomas Welschinger, Radolfzell (DE)

(73) Assignee: SULZER MANAGEMENT AG, Winterthur (CH)

( * ) Notice: Subject to any disclaimer, the term of this patent is extended or adjusted under 35 U.S.C. 154(b) by 85 days.

(21) Appl. No.: 13/786,435

(22) Filed: Mar. 5, 2013

(65) Prior Publication Data
US 2013/0315762 A1    Nov. 28, 2013

(30) Foreign Application Priority Data

Mar. 5, 2012    (EP) ..................................... 12158018

(51) Int. Cl.
*F16J 15/00* (2006.01)
*F16J 15/06* (2006.01)
*F04D 29/08* (2006.01)

(52) U.S. Cl.
CPC ............... *F16J 15/06* (2013.01); *F04D 29/086* (2013.01); *F16J 15/061* (2013.01)

(58) Field of Classification Search
CPC ......... F16J 15/06; F16J 15/061; F16J 15/062; F16J 15/064
USPC .................................. 277/637, 649, 650, 944
See application file for complete search history.

(56) References Cited

U.S. PATENT DOCUMENTS 2,246,977 A    6/1941  Kraft
5,513,859 A    5/1996  Huber et al.

FOREIGN PATENT DOCUMENTS

DE    3300505 A1 *   1/1983    ............... F16J 15/10
DE    10 2009 061 001 A1    7/2011
EP    2 202 432 A1    6/2010
GB    2 097 070 A    10/1982

OTHER PUBLICATIONS

European Search Report mailed on Jul. 31, 2012, for EP Patent Application No. 12158018.7, 4 pages.

* cited by examiner

*Primary Examiner* — Gilbert Lee
(74) *Attorney, Agent, or Firm* — Kilpatrick Townsend & Stockton LLP

(57) ABSTRACT

A sealing arrangement for placement between two components which have a planar contact surface, in particular two housing parts of a pump. The sealing arrangement has an elongate, flexible sealing element whose end region has a termination element thereon, which can carry out a sealing function. The sealing element and the termination element have an overlap region in the end region of the sealing element and thus form a first continuous sealing edge. The sealing edge is maintained also for a displacement of the end region of the sealing element in the direction of the start region within the overlap region. The termination element moreover has a first curvature. The curvature and the sealing element are configured so that the sealing element contacts the termination element along the curvature in a pressure-free state.

11 Claims, 2 Drawing Sheets

SEALING ARRANGEMENT AND PUMP HAVING A SEALING ARRANGEMENT

CROSS-REFERENCE TO RELATED APPLICATION

Figure 1:
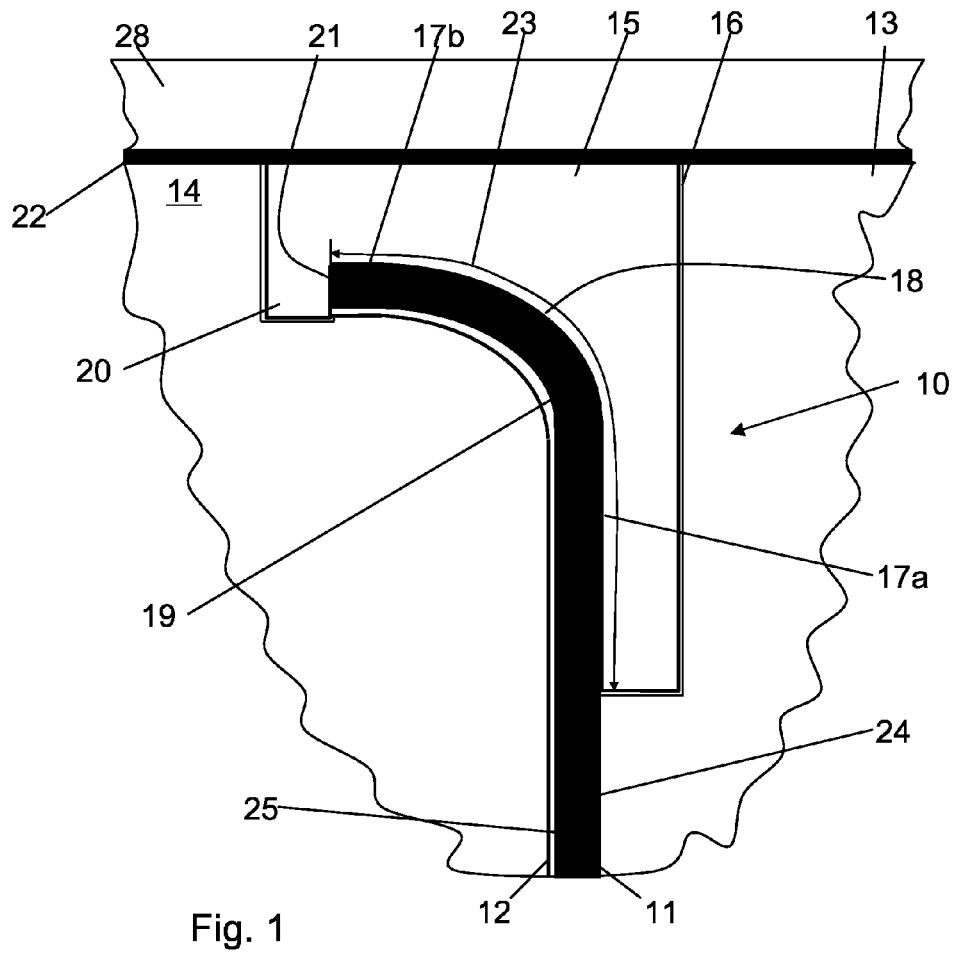

This application claims the priority to the European Patent Application No. 12158018.7, filed Mar. 5, 2012, the disclosure of which is incorporated by reference herein.

The invention relates to a sealing arrangement in accordance with the preamble of claim 1 and to a pump having a sealing arrangement.

It is known that sealing arrangements are provided between two components which have a planar contact surface. Thus, for example, pressure spaces which are at least partly formed by the two components can be sealed off. This is, in particular the case for pumps having a divided housing in which a sealing arrangement is provided between the two housing parts.

In this connection so-called flat seals are used, for example. These can be manufactured from different materials, such as for example, elastomers, pressing fibers, aramid fibers, carbon fibers, mineral fibers or metal. Depending on the purpose of use a matching flat seal can be selected. A good sealing effect can be achieved with such seals. However, the components forming the contact surface are only allowed to deform slightly with regard to an ideal installation state, since flat seals can only compensate small deformations of the contact surface. In order to prevent deformations, the components to be sealed off must be designed so stiff on the use of flat seals that only such small deformations take place that the functional capability of the flat seal is not endangered also for large loads, i.e. in a pump at very high pressures. In order to achieve this, for example, larger wall thicknesses and/or complex ribs can be provided.

Moreover, a sealing arrangement for arrangement between two components which have a planar contact surface is known from DE 33 00 505 A1. The two components are designed as housing parts of an elongate divided housing of a pump. An elongate flexible sealing element in the form of a sealing string having a start region and an end region is arranged in a groove of the contact surface for sealing. The sealing cord has a flexible termination element in the form of a thickened end at its end region which thickened end is designed so that it can carry out a sealing function. The sealing element and the termination element are designed so that they have an overlap region in the end region of the sealing element and thus form a continuous sealing edge. The termination element is fixedly connected to the sealing element. It can, for example, be designed as an initially separate element which is fixedly connected to the sealing cord in a special work step, for example, by adhesion or by vulcanization.

In contrast to this it is the object of the invention to suggest a sealing arrangement which is simple to manufacture and can be mounted in a simple manner. This object is satisfied in accordance with the invention by a sealing arrangement having the features of claim 1.

In accordance with the invention the sealing element is displaceably arranged, i.e. in particular the end region of the sealing element is displaceably arranged relative to the termination element, so that the sealing edge is maintained also for a displacement of the end region of the sealing element in the direction of the start region within the first overlap region. The sealing element and the termination element are thus not fixedly connected to one another, but are designed as two separate parts also in the installed state which parts can be mounted separate from one another. The sealing element can thus be compressed to a certain degree in its longitudinal direction without the sealing edge being interrupted thereby. The sealing effect is thus also maintained in this case. The overlap region is selected so that the sealing function is maintained also for a maximum displacement of the end region arising during operation.

The termination element moreover has a curvature. The curvature is designed and the sealing element is arranged so that the sealing element contacts the termination element along the curvature in the pressure-free state. Also the sealing element is curved due to the curvature of the termination element. Due to the strain thereby arising within the sealing element it presses against the termination element in the curvature. Although the sealing element and the termination element are designed as two parts no gap is present between the two elements and they form a continuous sealing edge also in the pressure-free state. A "pressure-free state" is to be understood in this connection such that the same pressure is present at both sides of the sealing element, in particular such that atmospheric pressure is present at both sides of the sealing element.

Thus a secure function of the sealing arrangement having a flexible sealing element and a termination element is achieved which elements are not fixedly connected to one another. This enables a simple installation of the sealing arrangement, since the sealing element and the termination element can be mounted separately from one another. Furthermore, no work step for the solid connection of the two elements is necessary which would be associated with time, effort and therefore ultimately with cost.

The sealing element and the termination element are arranged, in particular on assembly so that the curvature of the termination element is open in the direction at which the higher pressure is present during operation. Thus, the sealing element is pressed against the termination element during operation and thereby a particularly effective sealing effect is achieved.

Furthermore, it can thus be prevented that the sealing element is pressed away from the termination element, i.e. is lifted off and thus a gap and therefore a leak arises between the termination element and the sealing element.

The sealing element and the termination element are, in particular manufactured from an elastomer, wherein both the same material and also different materials can be used. The termination element is, in particular designed from a less flexible material. The elements can also be manufactured from different suitable materials.

The sealing element in particular has a round cross-section, it is thus in particular designed as a so-called round cord. A round cord is quasi a "cut open" O ring and has the same advantages as the O ring with regard to the sealing function. However, also other cross-sections are possible, for example, oval, rectangular, x-shaped cross-sections are possible.

In an embodiment of the invention a side surface of the first termination element orientated in the direction of the sealing element has a contour corresponding to an outer contour of the sealing element. Thus, for example, for a design of the sealing element as a round cord and therefore having an outer contour, the mentioned lateral surface has at least a section with a contour having a corresponding complementary rounded contour. A large contact surface and therefore a large sealing surface can be achieved between the sealing element and the termination element, with the mentioned corresponding contours, whereby a good sealing effect is achieved. Furthermore, the sealing element can contact and/or abut particularly close at the termination element in a pressure-free state so that the above-mentioned danger of the lift-off of the sealing element from the termination element is particularly small.

In an embodiment of the invention the first termination element and the first sealing element are designed and arranged so that in a pressure-free state the first sealing element abuts at the first termination element with an end surface, i.e. a cross-sectional surface. The termination element in particular has a projection orientated perpendicular to the mentioned curvature of the termination element for this purpose. Thus, it can advantageously be prevented that fluid can penetrate between the sealing element and the termination element and thus that the sealing element can lift off from the termination element. The sealing element can in particular be installed so that it is compressed a little in the longitudinal direction through the abutment of the termination element, whereby the mentioned penetration of the fluid is particularly effectively prevented.

In an embodiment of the invention, the sealing element is arranged in a groove and the termination element is arranged in a cutout. A particularly good sealing effect is thereby achieved. In this connection, the mentioned cutout is in particular designed, so that the termination element is compressed a little on assembly of the two components to be sealed, whereby a good sealing effect of the termination element results.

In an embodiment of the invention the termination element can receive at least a second elongate flexible sealing element in analogy to the first elongate flexible sealing element. The second sealing element and the first termination element are thus designed and arranged so that they have a second overlap region in a second end region of the second sealing element and thus also have a second continuous sealing edge. This second sealing edge is also maintained for a displacement of the second end region of the second sealing element in the direction of a second start region within the second overlap region. The first termination element has a second curvature and the second sealing element is arranged so that it contacts at the first termination element along the second curvature in the pressure-free state. Thus the first termination element forms a stop for the second sealing element in a manner analog to the first sealing element at the respective end region. It is also possible that a third or a fourth sealing element can be provided in an analog manner. Thus, a termination element can advantageously form a stop for two or more sealing elements.

The advantages of the sealing arrangement in accordance with the invention in particular come to fruition on use in a pump having a divided housing, with the sealing arrangement being arranged between a first housing part and a second housing part. The pump is provided for conveying a gas-like or liquid fluid, such as, for example, water, crude oil or similar. Very high pressures of up to 800 bar can be present in such pumps which is why functionally safe sealing arrangement are particularly important also for arising deformations of the housing parts of the pump. The sealing arrangement can be used for the sealing off of a pressure space towards the outside with regard to the environment of the pump. However, it is also possible to use the sealing arrangement in accordance with the invention for the mutual sealing off of different pressure spaces in the interior of the pump. Each leak between pressure spaces of the pump, generally separate from one another, lead to losses and thus to increased costs of operation on operation of the pump.

The pump is in particular designed as one step or multi-step radial centrifugal pump.

In an embodiment of the invention the housing of the pump is divided in the longitudinal direction at the level of a drive shaft. A low pressure region arranged at a first side of the drive shaft is sealed off with regard to its environment by means of a first elongate flexible element, the mentioned low pressure region is sealed off with regard to a high pressure region arranged at a first side of the drive shaft by means of a second elongate flexible sealing element and the mentioned high pressure region is sealed off with regard to the environment by means of a third elongate sealing element. The first termination element is designed and arranged so that it receives all three sealing elements and thus has overlap regions with all three sealing means at their end regions and curvatures corresponding to all three sealing means at their end regions.

Thus, a particularly secure sealing off of the two housing parts of the pump is possible.

In an embodiment of the invention, the curvature of the termination element is open in the direction of the pressure region having the higher of the two pressures present at the sealing element. Thus, the advantages already mentioned above of the mentioned alignment of the curvature results.

Furthermore, it is ensured thereby that also in the case in which the pressure builds up faster in the low pressure region than in the high pressure region it can lead to a fluid flow and thus to a leak from the low pressure region to the high pressure region at most for a short period of time; however, never from the low pressure region to the environment. Thus, a leak in the direction to the environment can be safely prevented. This possible leak from the low pressure region to the high pressure region is not critical as it can only arise for a short period of time on build-up of the pressure. This quasi has no negative influence on the efficiency of the pump.

In an embodiment of the invention, the sealing arrangement has at least a second termination element. The second termination element is arranged so that it receives a sealing element, i.e. it has an overlap region and a corresponding curvature at a start region of the sealing element. Thus, a comparably good sealing effect can be achieved like at the end region also at the start region of the corresponding sealing element.

In this connection it is possible that a second termination element is provided for each sealing element. However, a second termination element is only arranged at those sealing elements which, in particular take on a sealing function with regard to the environment. Thus, a particularly good sealing off of the pressure region with regard to the environment is achieved.

Further advantages, features and particulars of the invention result from the subsequent description of embodiments as well as with reference to the drawing, in which elements which are the same or which have the same function are referred to with the identical reference numerals.

Figure 2:
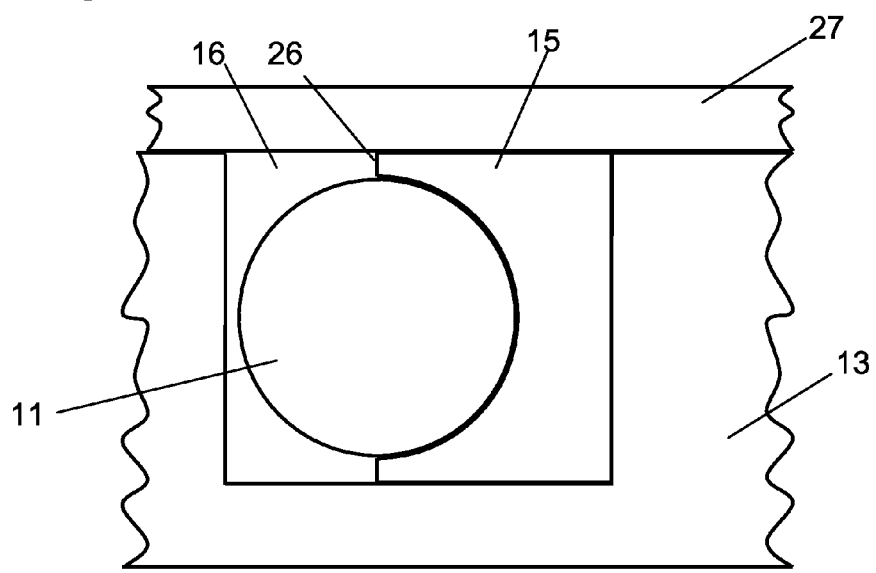
Figure 3:
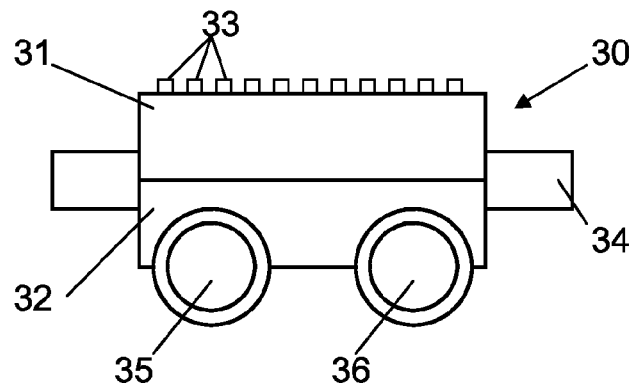

In this respect, there is shown:

FIG. 1 a section of a sealing arrangement having an end region of a sealing arrangement and a termination element in a top view;

FIG. 2 a section through a sealing element and a termination element in an overlap region between the sealing element and the termination element;

FIG. 3 a pump having a longitudinally divided housing in a side view; and

Figure 4:
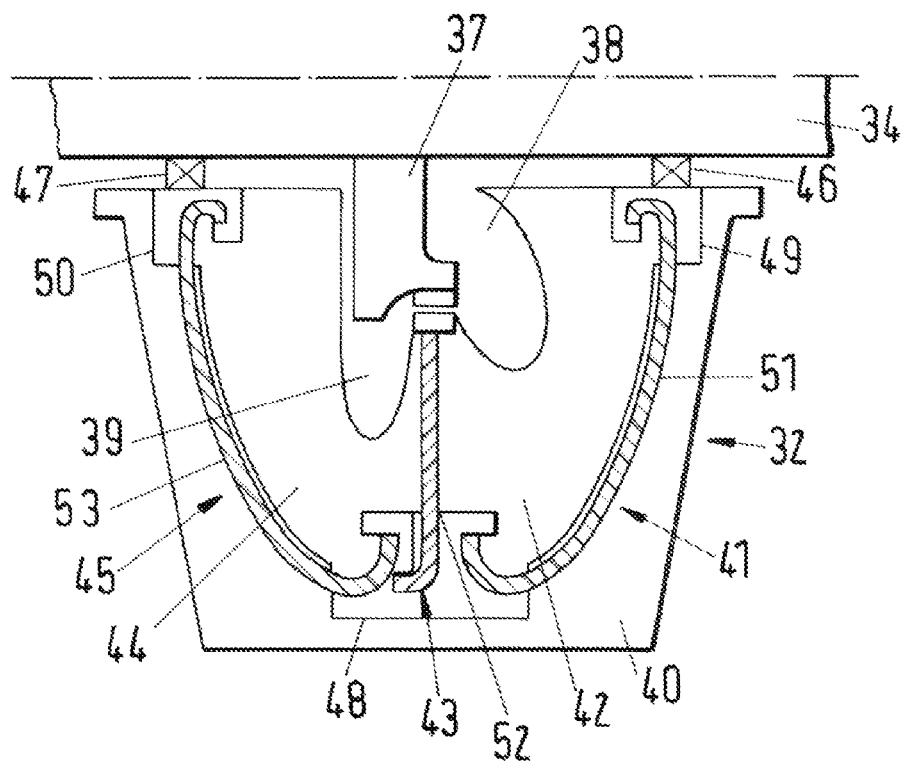

FIG. 4 a section through the pump at the level of a drive shaft.

In accordance with FIG. 1 a sealing arrangement 10 has an elongate flexible sealing element 11 in the form of a ring cord which is manufactured from an elastomer. The sealing element 11 is arranged in a groove 12 of a planar surface 14 of a first component 13 which component is only sectionally illustrated. The planar surface 14 forms a planar contact surface with respect to a second component not illustrated in FIG. 1, in a mounted state of the first component 13.

The sealing arrangement 10 furthermore has a termination element 15 which is arranged in a cutout 16 of a planar surface 14 of the first component 13. The termination element 15 is likewise manufactured from an elastomer, with it being designed stiffer than the sealing element 11. The cutout 16 is not so deep so that the termination 16 could be received completely therein. On a mounting of the second component, not illustrated in FIG. 1, the termination element 15 is compressed a little for this reason. It thus carries out a sealing function between the two components.

The basic shape of the termination element 15 is formed by two rectangular solids arranged perpendicular to one another, with the thereby resulting inner edges 17*a*, 17*b* not being designed straight, but rather having a curvature 18. The termination element 15 and the sealing element 11 are arranged relative to one another so that an end region 19 of the sealing element 11 also contacts at the inner edges 17*a*, 17*b* and thus also at the curvature 18 in a pressure-free state. The flexible sealing element 11 presses against the termination element due to the resulting curvature of the flexible sealing element 11, so that no gap results between the flexible sealing element 11 and the termination element 15.

In order to achieve an as large as possible contact surface and thus sealing surface between the sealing element 11 and the termination element a side surface 26 orientated in the direction of the sealing element 11 has a contour corresponding to an outer contour of the sealing element 11. As is illustrated in FIG. 2, the sealing element 11 designed as a round cord which has a circular outer contour. Correspondingly, the mentioned side surface 26 of the termination element 15 thus has an inwardly orientated half circle shaped contour. However, it is also possible that the contour of the side surfaces covers less than 180° of the outer contour of the sealing element 11.

The section of the sealing element 11 which then contacts at the termination element 15 can be referred to as an overlap region 23. Furthermore, the sealing element 11 and the termination element 15 form a continuous sealing edge 24 which is formed by a right outer edge of the termination element 15 and the sealing element 11 in FIG. 1.

The termination element 20 furthermore has an abutment 20 which is designed so that an end surface 21 of the sealing element 11 contacts at the abutment 20 at least in the pressure-free state. The abutment 20 is thus arranged perpendicular to the inner edge 17*b* of the termination element 15.

A pressure can be applied onto the sealing arrangement 10 from the left in FIG. 1. The pressure thus works so that it presses the sealing element 11 against the termination element 15 and thus also against the curvature 18. The curvature 18 is thus open in the direction of the side of the sealing arrangement 10 having the higher pressure. The object of the sealing arrangement 10 is to ensure a sealing off of the mentioned pressure in FIG. 1 to the right. At an edge 22 at which the termination element 15 abuts, i.e. towards the top in FIG. 1, no sealing off by the sealing arrangement 10 is necessary. In this direction a different, non-illustrated stop, for example a lid having a different sealing arrangement or a sliding ring seal is provided.

The termination element 15 generally serves the purpose of preventing a leak at the end region 19 of the sealing element 11, this means along the edge 22. If the sealing element 11 would perpendicularly contact the edge 22 without a termination element 15, then a sufficient sealing effect would thus only be provided when the end surface 21 of the sealing element 11 would contact at the edge 22 also on the application of pressure. Since the sealing element 11 is of flexible design this cannot be ensured. There would rather be the danger that, as soon as a small gap arises between the end surface 21 of the sealing element 11 and the edge 22, pressure then also acting in the gap would displace the end region 19 in the direction of a start region 25 lying opposite of the end region 19 of the sealing element 11 so that the sealing element 11 would thus be compressed and the gap would even be increased thereby. Therefore, the sealing effect in this region would no longer be ensured and a leak would be brought about.

The sealing effect of the sealing arrangement 10 is ensured also in the region of the edge 22, i.e. there where the termination element 15 is arranged, through the described design and arrangement of the sealing element 11 and the termination element 15. The end region 19 of the sealing element 11 can be displaced in the direction of the start region not illustrated in FIG. 1, the sealing element 11 can thus be compressed without the sealing edge 24 being interrupted due to the overlap region 23 of the sealing element 11 and the termination element 15. Furthermore, it is prevented that pressurized medium can arrive between the sealing element 11 and the termination element 15 and that the sealing element 11 can be lifted off from the termination element 15, whereby a gap and thus a leak would arise due to the abutment 20 and the described contact of the sealing element 11 at the termination element also in the pressure-free state.

The described sealing arrangement can in particular be installed in a pump having a divided housing. Such a pump is very schematically illustrated in FIG. 3. In accordance with FIG. 3 a pump 30, designed as a radial centrifugal pump, has an upper housing part 31 and a lower housing part 32 which are screwed to one another via screws 33. The two housing parts 31 and 32 are adjoined at a level of a drive shaft 34. A plurality of non-illustrated sealing arrangements corresponding to those of FIG. 1 and FIG. 2 are arranged between the two housing parts 31 and 32 in FIG. 3.

An inlet opening 35 and an outlet opening 36 are arranged at the lower housing part 32. The fluid to be conveyed, for example water, can be sucked in via the inlet opening 35 and can be provided at a higher pressure via the outlet opening 36. For this purpose, the pump 30 is driven by a non-illustrated electric machine via the drive shaft 34.

FIG. 4 shows a section through the pump 30 along a contact surface 40 between the two housing parts 31, 32. The contact surface 40 is symmetrically assembled with regard to the drive shaft 34, which is why it is only illustrated for one side of the drive shaft 34. An impeller 37 is rotationally fixedly connected to the drive shaft 34. The impeller 37 sucks fluid from a low pressure passage 38 which is connected to the inlet opening 35 and conveys it on an increase of the pressure into a high pressure passage 39 which is connected to the outlet opening 36.

The pump can also be designed as a multi-step pump. In this case the low pressure passage would be connected to a high pressure passage of the upstream pump step and the high pressure passage would be connected to a low pressure passage of a downstream pump step.

Three sealing arrangements are in total arranged at the contact surface 40. A first sealing arrangement 41 having a first elongate flexible sealing element 51 serves for the sealing off of a low pressure region 42 with regard to the environment of the pump 30. A second sealing arrangement 43 having a second elongate flexible sealing element 152 serves for the sealing off of the low pressure region 42 with regard to a high pressure region 44. A third sealing arrangement 45 having a third elongate flexible sealing element 53 serves for the sealing off of the high pressure region 44 with regard to environment.

In this connection the low pressure passage 38 is arranged within the low pressure region 42 which is formed at the illustrated first side of the drive shaft 34 by the impeller 37, by the second sealing arrangement 43, by the first sealing arrangement 41 and by a first gliding seal 46 arranged between the lower housing part 32 and the drive shaft 34 in extension to the first sealing arrangement 41.

The high pressure passage 39 is arranged within the high pressure region 44 which is formed at the illustrated side of the drive shaft 34 by the impeller 37, by the second sealing arrangement 43, by the third sealing arrangement 45 and by a second sliding ring seal 47 arranged between the lower housing part 32 and the drive shaft 34 in extension to the third sealing arrangement 45.

The three sealing arrangements 41, 43, 45 are designed corresponding to the sealing arrangement 10 of FIGS. 1 and 2. A common termination element 48 is arranged at their end regions at which termination element 48 all three respective sealing elements 51, 52, 53 of the sealing arrangements 41, 43, 45 merge and which has a respective curvature and a respective abutment for each of the sealing elements 51, 52, 53 corresponding to the termination element of FIGS. 1 and 2. In this connection the curvature of the second sealing arrangement 43 is open in the direction of a high pressure region 44.

The sealing element 51 of the first sealing arrangement 41 also has a second termination element 49 at its start region which directly adjoins at the sliding ring seal 46 and which also carries out a sealing function with regard to the sliding ring seal 46. The second termination element 49 is designed corresponding to the termination element 15 of FIGS. 1 and 2. The curvature of the second termination element 49 of the first sealing arrangement 41 is open with regard to low pressure region 42.

Likewise the third sealing arrangement 45 has a second termination element 50 also at the start region of the sealing element 53 which directly adjoins at the sliding ring seal 47 and also carries out a sealing function with regard to the sliding ring seal 47. The second termination element 50 is likewise designed corresponding to the termination element 15 of FIGS. 1 and 2. The curvature of the second termination element 50 of the first sealing arrangement 45 is open with regard to the high pressure region 44.

The second sealing arrangement 43 has no second termination element at the start region of the sealing element 52. In this context small leaks can be accepted since only fluid can arrive from the high pressure space 44 to the low pressure space 42 (or vice versa), but surely not into the environment.

It is ensured by the arrangement of the sealing arrangements 41, 43 and 45 that fluid can leak into the environment of the pump 30 at no point in time by the sealing arrangements 41, 43 and 45 described and illustrated in FIG. 4. No fluid can leak into the environment even then when the pressure in the low pressure region 42 rises faster than in the high pressure region 44 on starting the pump 30. In this case the sealing element 52 of the second sealing arrangement 43 can indeed be lifted off from the termination element 48, whereby a gap can arise between the sealing element 52 and the termination element 48. However, only fluid can arrive from the low pressure region 42 in the high pressure region 44 via the thereby arising gap, however, not into the environment. As soon as the pressure in the high pressure region 44 has settled at its normal level, high with regard to the low pressure region 42, after the start of the pump 30 the sealing element 52 of the second sealing arrangement 43 is pressed against the curvature of the termination element by the pressure in the high pressure region 44 so that the mentioned gaps can be closed and the leak can be terminated.

What is claimed is:

1. A sealing arrangement for placement between two components which have a planar contact surface, comprising:
    a first elongate flexible sealing element which comprises a first start region and a first end region; and
    a first termination element which is configured to carry out a sealing function;
    wherein the first sealing element and the first termination element are configured so that they have a first overlap region in the first end region of the first sealing element and thus form a first continuous sealing edge,
    wherein the first sealing element is displaceable relative to the first termination element so that the first sealing edge is maintained during a displacement of the first end region of the first sealing element in the direction of the first start region within the first overlap region; and
    wherein the first termination element has a first curvature and the first sealing element contacts the first termination element along the first curvature in a pressure-free state.

2. The sealing arrangement in accordance with claim 1, wherein a side surface of the first termination element oriented in the direction of the first sealing element has a contour corresponding to an outer contour of the first sealing element.

3. The sealing arrangement in accordance with claim 1, wherein the first termination element and the first sealing element are configured so that the first sealing element abuts at the first termination element with a first end surface in a pressure-free state.

4. The sealing arrangement in accordance with claim 1, wherein the first sealing element is disposed in a first groove.

5. The sealing arrangement in accordance with claim 1, wherein the first termination element is disposed in a first cut-out.

6. The sealing arrangement in accordance with claim 1, wherein the first termination element is configured to receive at least a second elongate flexible sealing element in analogy to the first elongate flexible sealing element.

7. A pump, comprising a divided housing comprising a first housing part and a second housing part, and a sealing arrangement in accordance with claim 1 disposed between the first housing part and the second housing part.

8. The pump in accordance with claim 7, wherein:
    the housing is divided in a longitudinal direction at the level of a drive shaft;
    a low pressure region at a first side of the drive shaft is sealed off with regard to an environment by means of the first elongate flexible sealing element;
    the low-pressure region is sealed off with regard to a high-pressure region at a second side of the drive shaft by means of a second elongate flexible sealing element,
    the high-pressure region is sealed off with regard to the environment by means of a third elongate flexible sealing element; and
    the first termination element receives the first, second, and third sealing elements.

9. The pump in accordance with claim 8, wherein the curvature of the termination element is open in the direction of the pressure region having the higher of the two pressures present at each of the sealing elements.

10. The pump in accordance with claim 8, further comprising:

a second termination element which receives the first sealing element, wherein the second termination element is disposed between the low-pressure region and the environment; and a third termination element which receives the third sealing element, wherein the third termination element is disposed between the high-pressure region and the environment.

11. The pump in accordance with claim 7, further comprising a second termination element which receives the first sealing element.

* * * * *